United States Patent Office 3,598,882
Patented Aug. 10, 1971

3,598,882
BLOCK COPOLYESTERS OF LINEAR SATURATED POLYESTERS AND POLYBUTADIENE-DIOLS
Ludwig Brinkmann and Helmut Frohlich, Frankfurt am Main, Germany, assignors to Farbwerke Hoechst Aktiengesellschaft vormals Meister Lucius & Bruning, Frankfurt am Main, Germany
No Drawing. Filed Sept. 26, 1968, Ser. No. 763,014
Claims priority, application Germany, Oct. 12, 1967, F 53,754
Int. Cl. C08f 29/10; C08g 17/06, 39/10
U.S. Cl. 260—873           9 Claims

ABSTRACT OF THE DISCLOSURE

Block copolyesters of linear saturated polyesters and polybutadiene-diol for the manufacture of shaped articles having a very high impact strength.

---

The present invention relates to thermoplastic polyester moulding compositions having improved properties.

It is known to mould thermoplastic moulding compositions comprising linear saturated polyesters of aromatic dicarboxylic acids and aliphatic or cycloaliphatic diols into shaped articles.

It is also known that the dimensional stability of the polyester compositions can be improved by adding nucleating agents. The shaped articles obtained in this manner have, however, a moderate impact strength only.

It has now been found that block copolyesters comprising:

(a) Linear saturated polyesters of aromatic dicarboxylic acids and aliphatic or cycloaliphatic diols and
(b) 2 to 15% by weight, calculated on the total composition, of polybutadiene-diol and having an impact strength of $F_{20} \geq 80$ cm. and a reduced specific viscosity of 0.9 to 1.5 dl./g. measured in a 1% solution in a 60:40 mixture of phenol and tetrachloroethane at 25° C., are distinguished by outstanding properties.

The polyester compositions according to the invention have a good dimensional stability and an improved impact strength. A further advantage of the modified polyesters resides in their content of double bonds resulting from the polybutadiene-diol constituent. These double bonds facilitate the metallizing of shaped articles by known methods for acrylonitrile/butadiene/styrene polymers, polypropylene, polysulfones, or polyoxymethylenes. Moreover, the surfaces of the modified polyesters are easier to print and the adhesiveness of printing inks is improved. Another advantage of the double bonds in the polyester compositions is that the surfaces can be better bonded and have improved laminating properties.

To modify the polyesters according to the invention they are reacted with the polymeric diol and, if desired, the reaction products are subjected to a post-condensation in the melt or in the solid state. Alternatively, the polybutadiene-diol can be added to the ester interchange mixture of dimethyl terephthalate with aliphatic or cycloaliphatic diols.

By incorporating polybutadiene-diol into the polyester block polycondensates are obtained with polybutadiene units, which polycondensates have a considerably better impact strength than the pure polyester.

The polybutadiene-diol used for modifying the polyester has a viscosity of 20 to 100 poises, determined at 30° C. and a hydroxyl number corresponding to 18–90 milligrams of KOH/g. The polybutadiene-diol can be prepared as described in Journal of Polymer Science (1961) vol. XLIX, issue 152, pages S9 to S11.

As linear saturated polyester of aromatic dicarboxylic acids and aliphatic diols polyethylene glycol terephthalate is preferably used. It is likewise possible to use other polyesters, for example poly-1,4-dimethylolcyclohexane terephthalate. In addition to terephthalic acid small amounts of other aromatic dicarboxylic acids such as naphthalenedicarboxylic acid, or aliphatic dicarboxylic acids such as adipic acid, may be used. The diol constituent may also be modified to a certain extent by adding small amounts of an aliphatic diol, for example butanediol, or a cycloaliphatic diol, for example 1,4-dimethylolcyclohexane.

The polyesters should have a reduced specific viscosity of 0.6 to 2.0 dl./g., preferably 0.9 to 1.6 dl./g. measured in a 1% solution in a 60:40 mixture of phenol and tetrachloroethane at 25° C.

Polyesters of lower reduced specific viscosity may alternatively be used and the viscosity raised within the preferred range by a post-condensation during the course of the mixing and ester interchange process.

The polybutadiene-diol units are preferably incorporated into the polyester with formation of block structures in the molten state. For this purpose the polybutadiene-diol is added to the polyester melt and the whole is thoroughly mixed with the exclusion of air and moisture. The ester interchange reaction is interrupted as soon as the desired viscosity is reached and the polycondensation product is transformed into granules by known methods.

Another way to produce block polycondensates consists in granulating the homogeneous mixture of the polyester with the polybutadiene-diol in an extruder and subjecting the granules to a post-condensation in the solid phase at elevated temperature and under reduced pressure.

The condensation rate in the solid phase increases with the temperature and should be such that during the ester interchange reaction the granules do not sinter together.

To improve the impact strength of the polyester 2 to 15% by weight of polybutadiene-diol are added.

To increase the speed of crystallization and the degree of crystallinity the condensation of the polyesters with polybutadiene-diol in the melt or in the solid state may be effected in the presence of nucleating agents. Alternatively, the nucleating agent may subsequently be applied to the block polycondensate of high molecular weight by subjecting to rotation the polyester granules and the nucleating agent for some time at room temperature under nitrogen or under reduced pressure.

Suitable nucleating agents are finely divided inorganic substances, optionally in combination with organic compounds. Polyester compositions containing, for example, talc, aluminum silicates or an organic pigment have a high crystallization speed so that in the manufacture of shaped articles, especially by injection moulding, shaped articles are obtained having a high crystalline proportion which does hardly change at a temperature above the second order transition temperature. Consequently, the shaped articles produced in this manner from the high molecular weight linear saturated polyester have a high dimensional stability and do not shrink.

The content of moisture of the granulated condensation products with block structure according to the invention should preferably be kept below 0.01% by weight to avoid degradation of the polyester composition. The polyester granules may be coated with a coating of an inert hydrophobic substance for example paraffin or wax, for example by adding 0.4% by weight of a wax having a drop point of 56° C. and subjecting the mixture to rotation at 90° C. for 5 hours.

The polyester compositions according to the invention are moulded at a temperature above the second order transition temperature. The shaped articles obtained have a good dimensional stability, a high impact strength and a high bending strength. When reinforced polyester compositions are produced by combining the block copolyesters of the invention with known fillers, or the compositions are blended with other polyesters, products having improved properties are obtained.

The following example serves to illustrate the invention but it is not intended to limit it thereto, the parts being by weight unless otherwise stated.

EXAMPLE 95 parts of finely divided polyethylene terephthalate having a reduced specific viscosity of 0.865 dl./g., measured in a 1% solution in a 60:40 mixture of phenol and tetrachloroethane at 25° C. and 5 parts of polybutadiene-diol having a viscosity of 50 poises at 30° C. were homogeneously fused together at 270° C. under a pressure of 0.8 mm. of mercury and while stirring.

After 1.5 hours the melt was cooled, the polycondensate was comminuted and the reduced specific viscosity determined. It was 0.735 dl./g., measured in a 1% solution of a 60:40 mixture of phenol and tetrachloroethane at 25° C. The product was then subjected to a condensation in the solid state in a rotating apparatus for 13 hours at 240° C. under reduced pressure. A polycondensate was obtained having a reduced specific viscosity of 1.20 dl./g. 0.2% by weight of China Clay Dinkie A was added as nucleating agent and the mixture was subjected to rotation for 2 hours at room temperature and under nitrogen. At 270° C. sheets of dimensions 60 x 60 x 2 mm. were injection moulded at a mould temperature of 150° C. and a moulding period of 15 seconds.

The impact strength of the sheets was tested by a drop test in which the test sheets were imposed to impact stress by allowing a falling hammer sliding on low friction tracks to drop vertically from various heights on to the sheets clamped in a frame. The tip of the dropping hammer represented a hemisphere having a radius of 10 millimeters. The hammer weighed 500 grams. As measurement for the impact strength there was taken the falling height $F_{20}$, that is the height in centimeters at which the impact energy was sufficient to break 20% of the sheets. 10 sheets were tested for each height.

The falling height $F_{20}$ of the injection moulded polycondensate was 93 centimeters.

In a comparison experiment the impact strength of a polyester of terephthalic acid and ethylene glycol having a reduced specific viscosity of 1.40 dl./g., measured in a 1% solution of a 60:40 mixture of phenol and tetrachloroethane at 25° C. was tested. This product had a falling height $F_{20}$ of 50 centimeters.

What is claimed is:

1. Block copolyesters consisting essentially of condensation products of (a) linear saturated polyesters of aromatic dicarboxylic acids and aliphatic or cycloaliphatic diols having a reduced specific viscosity of 0.6 to 2.0 dl./g. measured in a 1% solution in a 60:40 mixture of phenol and tetrachloroethane at 25° C. and (b) 2 to 15% by weight, based on the total weight of copolyester, of polybutadiene diols having a viscosity of 20 to 100 poises measured at 30° C. and a hydroxyl number corresponding to 18–90 mg. KOH per gram, said copolyester having an impact strength $F_{20}$ of at least 80 centimeters and a reduced specific viscosity of 0.9 to 1.5 dl./g.

2. A block copolyester as claimed in claim 1, wherein the linear polyester is polyethylene glycol terephthalate.

3. A block copolyester as claimed in claim 1, wherein the polyester is polycyclohexane-1,4-dimethylol terephthalate.

4. A block copolyester as claimed in claim 1, wherein the linear polyester contains, in addition to terephthalic acid units, units of other aromatic or aliphatic dicarboxylic acids.

5. A block copolyester as claimed in claim 1, wherein the linear polyester contains, in addition to terephthalic acid units, units of naphthalene-2,6-dicarboxylic acid, or adipic acid.

6. A block copolyester as claimed in claim 1, wherein the linear polyester contains, in addition to ethylene glycol units, units of other diols.

7. A block copolyester as claimed in claim 1, wherein the linear polyester contains, in addition to ethylene glycol units, units of butane-diol or 1,4-dimethylolcyclohexane.

8. A block copolyester as claimed in claim 1, wherein the starting polyester has a reduced specific viscosity of 0.9 to 1.6 dl./g., measured in a 1% solution in a 60:40 mixture of phenol and tetrachloroethane at 25° C.

9. Shaped articles produced from the block copolyesters claimed in claim 1.

References Cited

UNITED STATES PATENTS

| | | | |
|---|---|---|---|
| 2,512,723 | 6/1950 | Lanham | 260—873 |
| 2,595,625 | 5/1952 | Agnew | 260—75A |
| 3,041,320 | 6/1962 | Chapin et al. | 260—873 |
| 3,313,777 | 4/1967 | Elam et al. | 260—860 |
| 3,439,063 | 4/1969 | Reilly | 260—873 |

WILLIAM H. SHORT, Primary Examiner

E. WOODBERRY, Assistant Examiner

U.S. Cl. X.R.

260—75